United States Patent [19]
Rodgers

[11] 3,878,054
[45] Apr. 15, 1975

[54] DISTILLATION APPARATUS AND PROCESS

[75] Inventor: Franklin A. Rodgers, Brookline, Mass.

[73] Assignee: Pactide Corporation, Dover, Del.

[22] Filed: Feb. 8, 1973

[21] Appl. No.: 330,749

Related U.S. Application Data

[63] Continuation-in-part of Ser. No. 80,570, Oct. 14, 1970, abandoned, which is a continuation of Ser. No. 524,366, Dec. 27, 1965, abandoned, which is a continuation of Ser. No. 456,040, May 7, 1965, abandoned, which is a continuation-in-part of Ser. No. 417,039, Dec. 9, 1964, abandoned.

[52] U.S. Cl. ............... 203/11; 203/88; 203/89; 202/205; 159/DIG. 31; 159/DIG. 27
[51] Int. Cl. ......... B01d 3/00; B01d 3/10; B01d 3/06
[58] Field of Search ................ 203/10, 11, 88, 89; 159/DIG. 27, DIG. 31; 202/205

[56] References Cited
UNITED STATES PATENTS

| | | |
|---|---|---|
| 2,445,350 | 7/1948 | Ginnings............................ 202/234 |
| 3,119,752 | 1/1964 | Checkovich........................... 203/11 |
| 3,129,145 | 4/1964 | Hassler................................ 202/174 |
| 3,340,186 | 9/1967 | Weyl..................................... 210/22 |

Primary Examiner—Jack Sofer
Attorney, Agent, or Firm—Michael Bard; John W. Fricson

[57] ABSTRACT

A distillation method and apparatus especially adapted for the desalination of water, in which bodies of a vaporizable liquid such as water are maintained in contact with opposite sides, respectively, of a microporous membrane non-wettable by the liquid and having through pores for passing the vapor of the liquid, the vapor of the liquid is caused to pass through the membrane by heating one body of liquid while cooling the other and substantially all gas except the vapor of the liquid is removed from the pores of the membrane by degassing at least the heated liquid prior to introducing it into contact with the membrane.

25 Claims, 8 Drawing Figures

DISTILLATION APPARATUS AND PROCESS

This application is a continuation-in-part of application Ser. No. 80,570, filed Oct. 14, 1970, in turn a continuation of application Ser. No. 524,366, filed Dec. 27, 1965, in turn a continuation of application Ser. No. 456,040, filed May 7, 1965, in turn a continuation-in-part of application Ser. No. 417,039, filed Dec. 9, 1964, all the above now abandoned.

This invention relates to novel and improved liquid and heat transfer apparatus and methods and more particularly to distillation apparatus and methods for transferring liquids directly from one body of liquid to another.

Distillation apparatus and methods of the type with which the present invention is concerned generally comprise means for transferring heat to a body of liquid to be purified such as saline water, to transfer the liquid as a vapor across a barrier to another body of liquid from which heat is removed. The barrier is designed to separate the two bodies of liquid so that there is no liquid flow or leakage from one to the other, while allowing the vapor of the liquid to pass by diffusion from the evaporating liquid body or distilland, to which heat is transferred, to the condensing liquid body, or distillate, from which heat is transferred.

Objects of the invention are: to provide novel and improved distillation apparatus and methods wherein heat is transferred to a body of liquid (distilland), such as saline water, to vaporize the liquid, and the vapor is transferred across a barrier to a second body of liquid (distillate) where the vapor is condensed; to provide apparatus and methods of the type described in which the barrier between the bodies of distilland and distillate comprises a space containing substantially only gas in contact with the bodies at a lower pressure than the hydrostatic pressure of the bodies of liquid; to provide distillation apparatus and methods of the type described wherein the bodies of liquid are formed as thin films or sheets supported substantially only at their outer surfaces; to provide multiple effect distillation apparatus and methods incorporating the foregoing features; and to provide distillation apparatus and methods of the type described characterized by a simple and inexpensive construction and more efficient operation.

Other objects of the invention are: to provide a novel and improved porous membrane constituting a gas-filled barrier for separating adjacent bodies of distillate and distilland and allowing transfer of substantially only vapor across the barrier between the two bodies; to provide a porous film as described which may be located in direct contact with two bodies of liquid which it separates and characterized by its thinness and improved impermeability to the liquid coupled with reduced resistance to diffusion of the vapor of the liquid; and to provide a porous membrane for supporting bodies of distillate and distilland in contact with a gas-filled barrier space maintained at a lower pressure than the hydrostatic pressures of the liquid bodies.

Other objects of the invention will in part be obvious and will in part appear hereinafter.

The invention accordingly comprises the apparatus possessing the construction, combination of elements and arrangement of parts and the method involving the several steps and the relation and order of one or more of such steps with respect to each of the others, which are exemplified in the following detailed disclosure, and the scope of the application of which will be indicated in the claims.

For a fuller understanding of the nature and objects of the invention, reference should be had to the following detailed description taken in connection with the accompanying drawings wherein.

Figure 1:
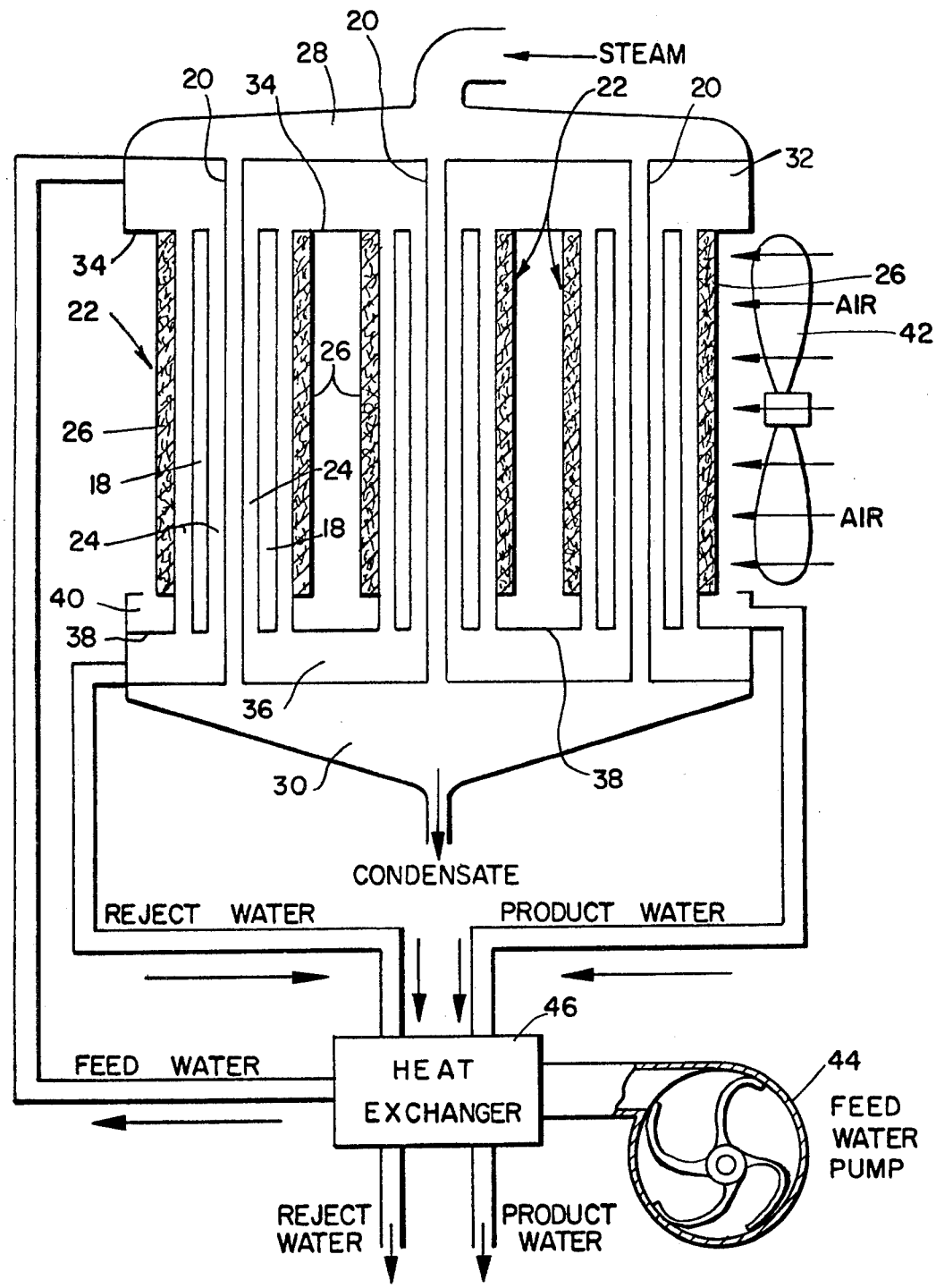
FIG. 1 is a somewhat schematic diagram illustrating distillation apparatus embodying the invention and adapted to practice the method thereof.

A number of forms of distillation, or liquid and heat transfer, apparatus and methods have been proposed similar to the apparatus and method of the present invention in which a liquid, particularly water, is transferred as a vapor from a thin evaporating sheet of film of liquid to which heat is transferred across a barrier to a thin condensing sheet or film of liquid from which heat is transferred. Apparatus of this general type is disclosed, for example, in U.S. Pat. Nos. 2,445,350, issued July 20, 1948, and 3,129,145, issued Apr. 14, 1964. In each of the apparatus and methods disclosed as well as the apparatus and method of the invention, the problem is to achieve the most efficient liquid and heat transfer with the least complex and expensive structure. The answers to this problem are to be found in the particular design and construction of means for forming bodies of liquid as thin sheets or films of feed or vaporizing liquid, termed distilland, and product or condensing liquid, termed distillate; transferring heat to and from the two liquid bodies; and, most important, the design, construction, and composition of the liquid-impermeable barrier between the sheets of liquid across which the liquid is transferred as a vapor. The design and construction of these components and the operating conditions of the apparatus are determinative of the operating efficiency by virtue of their control over such operating factors as rates and efficiency of liquid flow, leakage between liquid sheets, vapor diffusion and heat transfer rates, operating temperatures and pressures; and overall economic factors such as reliability, operating life, auxiliary and supporting equipment required, maintenance costs, and capital investment.

Distillation apparatus is essentially a heat transfer system including means for transferring heat to a body of distilled liquid to vaporize the liquid and means for transferring heat from vapor to cause condensation thereof; and a multiple effect system comprises a repetitive sequence of heat exchange stages in which heat transferred from the vapor is utilized to vaporize more liquid, and so forth. Heat is transferred most efficiently to, through, and from a body of liquid when the liquid, which may be a relatively poor heat conductor, takes the form of a very thin sheet or film and, accordingly, the ideal heat and liquid transfer system might comprise a thin vaporizing sheet of liquid located in face-to-facce juxtaposition with a thin condensing sheet or liquid with the liquid sheets separated by an infinitely thin barrier offering no resistance to vapor diffusion.

In a multiple effect system, each succeeding condensing liquid sheet would be separated from the subsequent evaporating liquid sheet to which it transfers heat by a barrier offering the smallest possible resistance to heat transfer. The structural and operating factors primarily determinative of overall efficiency of distillation apparatus are, to a great extent, dependent upon operating temperatures and pressures. For example, when operating temperatures are relatively high, e.g., near or above the boiling point of the liquid (for water, above 150°F), factors affecting heat transfer, such as the thickness of the evaporating and condensing liquid sheets and the rates of flow of the liquids are controlling; whereas at relatively low operating temperatures, e.g., significantly below the boiling point of the liquid (for water, below 150°F), factors such as pressure differentials, which determine liquid transfer rates, particularly vapor diffusion rates, assume a much greater importance. And, of course, in any type of distillation apparatus, the cost per unit quantity of product cannot be neglected and this is primarily a function of both efficiency of operation and initial cost of the apparatus.

Distillation apparatus has been proposed in the aforementioned patents in which a porous barrier is employed to separate an evaporating layer or sheet of liquid from a condensing sheet of liquid, together with a variety of expedients for preventing liquid transfer from the evaporating to the condensing sheets including, for example, forming the liquid sheets as layers of absorbent material impregnated with the liquids and providing relatively thick barriers and/or air gaps and pressure differentials such that the pressure of the gas in the gap or barrier is greater than the hydrostatic pressure of the liquids. All of these expedients tend to reduce efficiency whether the apparatus be operated at relatively low or relatively high temperatures, since for high temperature operation, the liquid sheets should be very thin and the flow rates high, but the absorbent or permeable material necessitates relatively thick liquid sheets and impedes liquid flow; and at low temperature operation, the same factors apply in addition to resistance to vapor diffusion characteristic of the vapor permeable liquid barriers including porous sheets, air gaps, pressure differentials and the like.

The greatly improved efficiency of the distillation apparatus and method of the invention at both relatively high and relatively low temperatures is the result of a novel porous film which is very thin and offers a minimum of resistance to vapor diffusion while being so constructed that the evaporating and condensing liquid sheets consist of only sheets or films of liquid that are thin and can directly contact the surfaces of the porous film.

Figure 2:
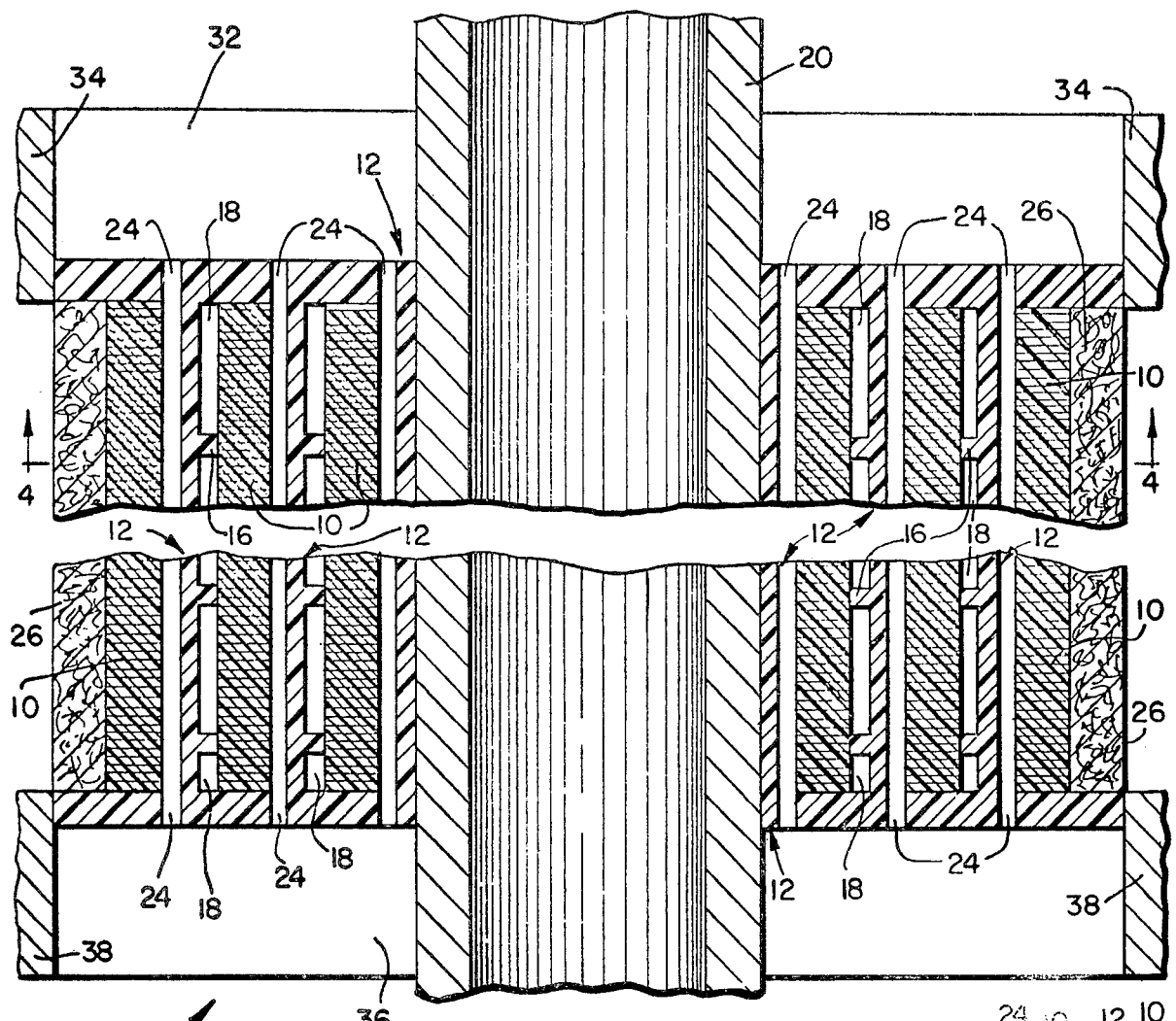
FIG. 2 is an enlarged sectional view similar to FIG. 1 taken through a portion of the apparatus thereof and showing in detail the construction of the apparatus.
Figure 3:
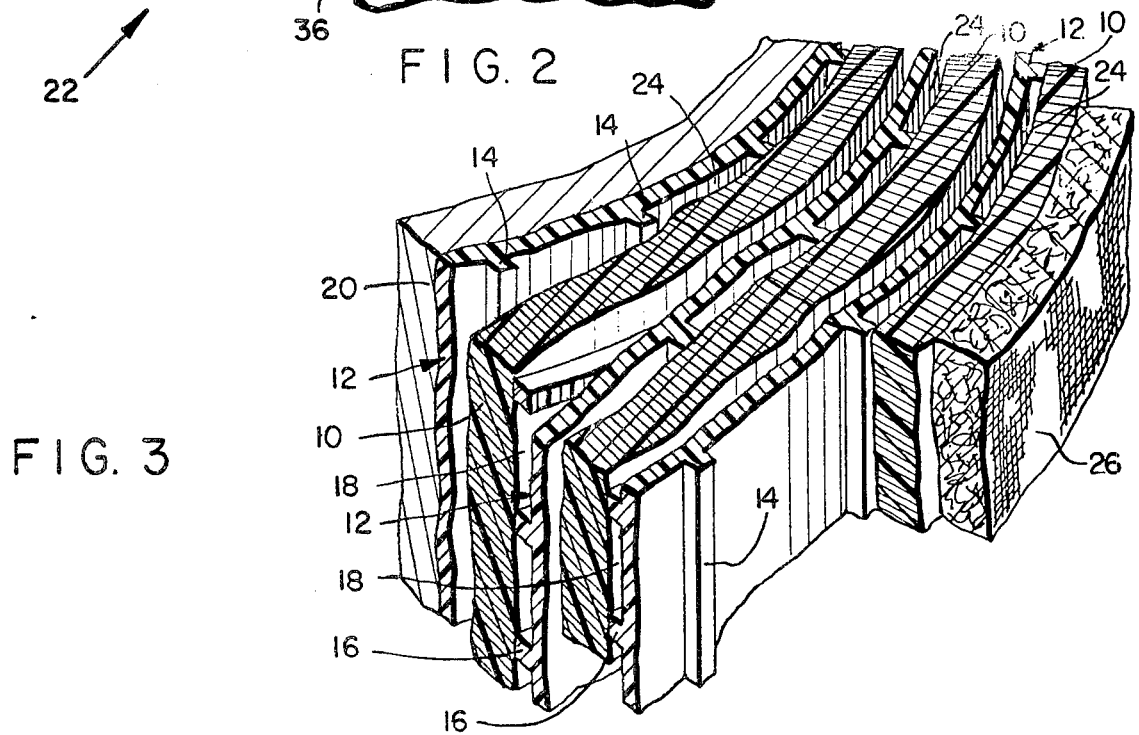
FIG. 3 is a fragmentary perspective view, partially in section, showing the construction of a portion of the apparatus of FIG. 2.
Figure 4:
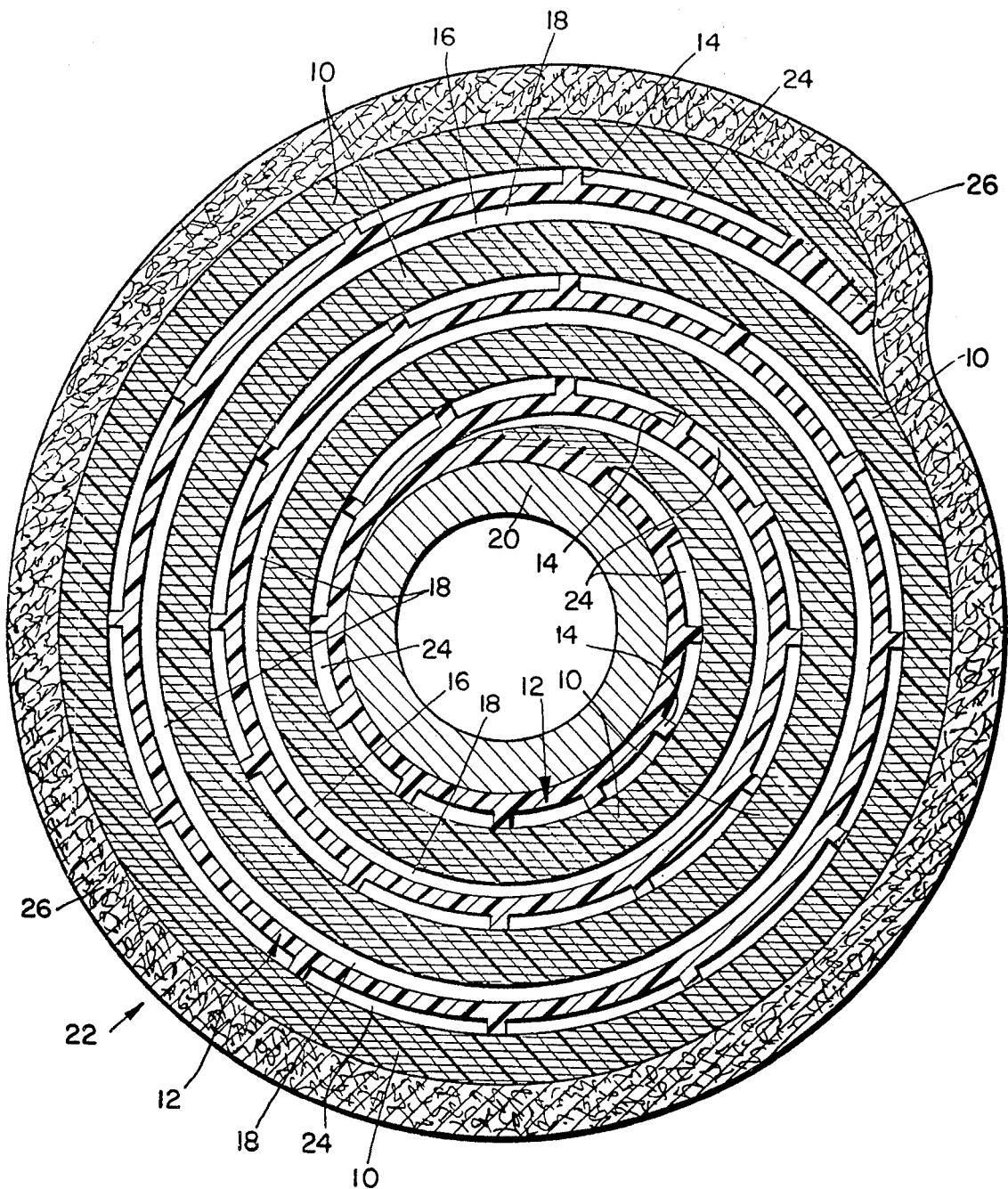
FIG. 4 is a sectional plan view taken substantially along the line 4—4 of FIG. 2.

The porous film of the invention, designated 10 in FIGS. 2 – 4 of the drawings, comprises a thin sheet material formed with a multiplicity of microscopic through pores or passages of substantially uniform size and which occupy the major portion (e.g., 80 to 85 percent) of the total volume of the film. Porous film or membrane 10 is not only thinner than barriers heretofore proposed, but is designed to be operated in direct contact with adjacent films or sheets of evaporating and condensing liquid, with the evaporating and condensing liquids at hydrostatic pressures equal to or greater than the pressure of the other portions of the system, particularly the gas within the pores of the film.

The design of the porous film is based on the discovery that the aforementioned conditions are possible and minimum diffusion resistance is achieved, if the through pores are of a maximum size yet so constituted as to be unable to pass the liquid and permit the apparatus to be operated under conditions such that the pores contain only gas, namely, the vapor of the liquid and any gas dissolved therein substantially at the vapor pressure of the liquid (and any dissolved gas). Thus, if the evaporating liquid has been thoroughly degassed, the pores will contain only a gas consisting of the vapor of the liquid; and this gas within the pores can and, in the preferred embodiment, will be at a substantially lower absolute pressure than the absolute hydrostatic pressure of either sheet of liquid in contact with the film, thereby further reducing resistance to vapor diffusion. The operating condition described is readily achieved with a properly designed and constructed porous film, particularly when the liquid is water, by shielding the film having pores initially containing air from the ambient atmosphere by a layer of degassed water in contact with both surfaces of the film to create a condition in which the air in the pores is absorbed by the water reducing the absolute pressure in the pores to substantially the vapor pressure thereof; and this reduced pressure, as noted, significantly reduces resistance to diffusion of the vapor from the evaporating sheet through the pores to the condensing sheet.

The walls of the passage should be non-wettable by the particular liquid for which the apparatus is designed and the cross sections of the pores or through passages are preferably circular, but may be oblate and/or irregular. However, one method of determining optimum pore size is to consider the pores as having essentially circular cross sections with an effective diameter, the "effective diameter" for any hole being defined as the diameter of a circular hole which functions in the same manner. The maximum effective diameter of each pore is dependent upon several factors, namely, the surface tension ($\gamma$) of the vaporizable liquid (commonly measured as force per unit length), the angle of contact ($\theta$) at the liquid-gas interface with $\theta$ approximately 90 degrees or more, and the differential between the absolute hydrostatic pressure of the higher of the hydrostatic pressures of the evaporating and condensing liquids and the absolute pressure of the gas within the pores ($\Delta P$). Under the operating conditions, each pore should have the largest possible effective diameter that does not exceed the value:

$$-(4\gamma \cos\theta/\Delta P)$$

More specifically, in the above equation, the derived maximum "effective diameter" for any pore corresponds to a size that will withstand the pressure differential $\Delta P$ without allowing the liquid water at the higher of the hydrostatic pressures to fill the membrane pores.

If we define the "displacement pressure" of the membrane to be that pressure differential across the air-filled membrane which will be sufficient to cause liquid water to pass therethrough, it is clear that by making the pores sufficiently small, the design $\Delta P$ may be made sufficiently large such that the displacement pressure of the membrane will not be exceeded under operating conditions.

Obviously, the pressure within the membrane pores may never exceed the lower of the hydrostatic pressures of the evaporating and condensing liquids.

In essence, then, the displacement pressure of any particular microporous membrane designed in accordance with the above equation will be equal to the value of $\Delta P$ corresponding to the effective pore diameter of the membrane.

Thus, by determining maximum effective pore diameter according to a design value of $\Delta P$ that exceeds the operating value of $\Delta P$ (when the evaporating liquid is completely deaerated and all of the air in the membrane pores is thereby removed), the membrane pores will not fill with liquid water. Where $\theta$ is determined under equilibrium conditions, it should be noted that the foregoing equation, while theoretically correct, does not take into account certain hysteresis effects which permit a material with a lower than expected contact angle to be used. More particularly, designing a microporous membrane according to the foregoing equation will yield a corresponding figure for maximum effectivie pore diameter, with $\theta = \theta$ equilibrium.

In a given situation, it may prove desirable to select a suitable membrane by directly measuring displacement pressure rather than designing a membrane according to the aforementioned equation. Such a procedure may prove particularly desirable when utilizing materials exhibiting lower contact angles.

In applying the foregoing equation, it should be noted that the value of $\theta$ used should be that of the advancing contact angle, i.e., the angle of contact of an advancing liquid front on the surface in question. For a more thorough discussion of advancing contact angle in contradistinction to the more normally encountered equilibrium contact angle, reference may be had to A. M. Schwartz, et al., *Contact Angle*, Wettability and Adhesion, Advances in Chemistry Series, "Resistance to Flow in Capillary Systems of Positive Contact Angle," Vol. 43, p. 250.

By way of example, for water, the maximum pore diameter calculated as above is approximately 0.75 microns assuming a contact angle of 105° and a maximum pressure differential or displacement pressure of one atmosphere. Where the actual $\Delta P$ under operating conditions is less than one atmosphere, such pores will contain only water vapor.

The pores should, of course, occupy the maximum possible proportion of the film because vapor transfer is through the pores and the thermal conductivity of the film is related to the proportion of solids comprising the film. The thermal conductivity of the porous film should be as small as possible since heat transfer between bodies of liquid on opposite sides of the film should be by way of the vapor in the pores rather than by conduction through the film.

Materials useful for the porous film primarily include the organic plastics which are insoluble in the particular vaporizable liquid (e.g., water), to be purified by the distillation apparatus, and are able to withstand the operating temperature encountered. For distillation apparatus intended and designed to purify water primarily by removing dissolved salts, useful plastic materials include, for example, polyvinyl, chloride, cellulose nitrate, cellulose acetate, cellulose triacetate, ethyl cellulose, nylon, polytetrafluoroethylene, and polycarbonate. The porous plastic film may be inherently non-wettable by the liquid or it may be treated in such a way as to render the surfaces thereof, including the pores, non-wetting. For example, a cellulose acetate porous film for use in the distillation of water may be coated with a silicone water repellant such as sold by General Electric Company under the trade name "Dri-film" No. 1040 or No. 1042, or designated SS 4029, resulting in a contact angle of approximately 105°. The coating of a waterproofing compound of this type rendering the porous film non-wettable is extremely thin and has no discernible effect on the pore size. The porous film itself should be as thin as possible consistent with the physical strength necessary to remain intact under the operating conditions of the apparatus (e.g., temperature, pressure, etc.), and in the preferred embodiment, ranges from 0.002 to 0.006 inch thick. Examples of microporous films useful in the method of the invention for purifying water include microporous filter media sold by Gelman Instrument Company having pore sizes of approximately 0.45 micron and thickness of 0.005 inch and designated:

GM - 6 (cellulose acetate)
GA - 6 (cellulose triacetate)
VM - 6 (polyvinyl chloride)
VNW - 450 (nylon supported polyvinyl chloride)
Alpha - 6 (regenerated cellulose) Similar microporous filter media are sold by Millipore Filter Corporation under the trademark "Standard MR" and "Microweb" and have thicknesses of approximately 0.006 inch and pore sizes with effective diameters of 0.45 micron. These and similar materials are particularly desirable because they exhibit a high degree of uniformity in pore size, the pores represent the major proportion of the total volme of the film, and the films exhibit relatively poor thermal conductivity.

The microporous film designated 10 is combined with a liquid and vapor impermeable barrier film 12 to form a two-ply or two-film structure which is the basic component of distillation apparatus comprising the invention. Barrier film 12, as previously noted, is designed to form, maintain, and separate the evaporating and condensing sheets of liquid and, accordingly, is required to be impermeable to both the liquid and vapor thereof, and is preferably a good thermal conductor inasmuch as heat is transferred through the barrier film to the evaporating sheet and from the condensing sheet. Barrier film 12 is formed of thin sheet materal in order to maintain the resistance of the film to heat transfer at a minimum to the end that the thermal conductivity of the material of which the film is formed may, at relatively low operating temperatures, constitute a very minor factor in the overall operating efficiency of the apparatus. In this case, the composition of barrier film 12 will depend to a major extent on the nature of the particular liquids involved and compatibility of the film therewith, the operating temperatures of the apparatus, cost, ease of fabrication and assembly, and lastly, thermal conductivity. Suitable materials for use as barrier film 12 include metals such as copper and aluminum, having good heat conducting properties and available in thin sheet form, and organic plastics which are compatible with the liquids and have the requisite structural strength at the operating conditions of temperature and pressure. For distillation apparatus designed to purify saline water, typical materials useful for barrier film 12 include aluminum (with a protective coating), preferred over copper because of its lower cost, or plastic materials such as polycarbonates, polyesters, polyethylene, polypropylene, and halogenated polyethylene, particularly the fluorocarbons.

Fluorocarbons such as polyvinylidene fluoride are particularly desirable because of their superior dimensional stability under conditions of 100 percent humidity and high temperature and salinity and their resistance to damage by biological growth.

Figure 5:
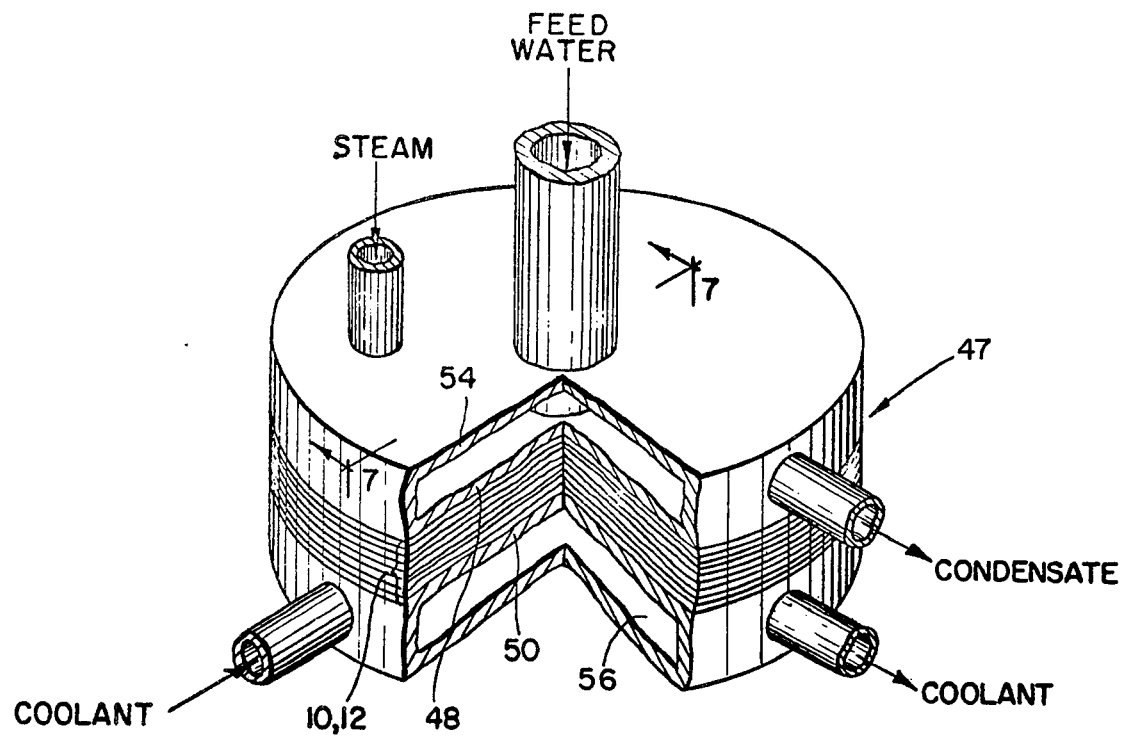
FIG. 5 is a perspective view, partially in section, illustrating another embodiment of distillation apparatus according to the invention.
Figure 6:
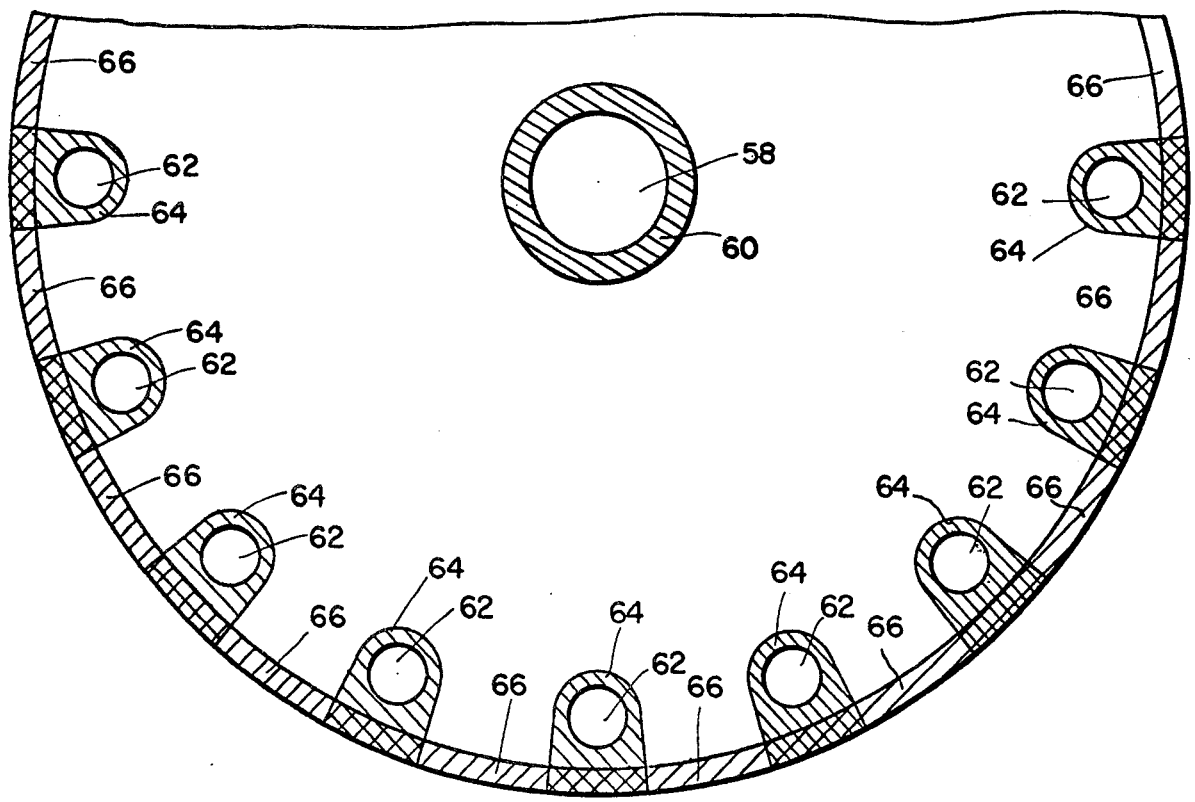
FIG. 6 is a somewhat schematic plan view of the apparatus of FIG. 5.
Figure 7:
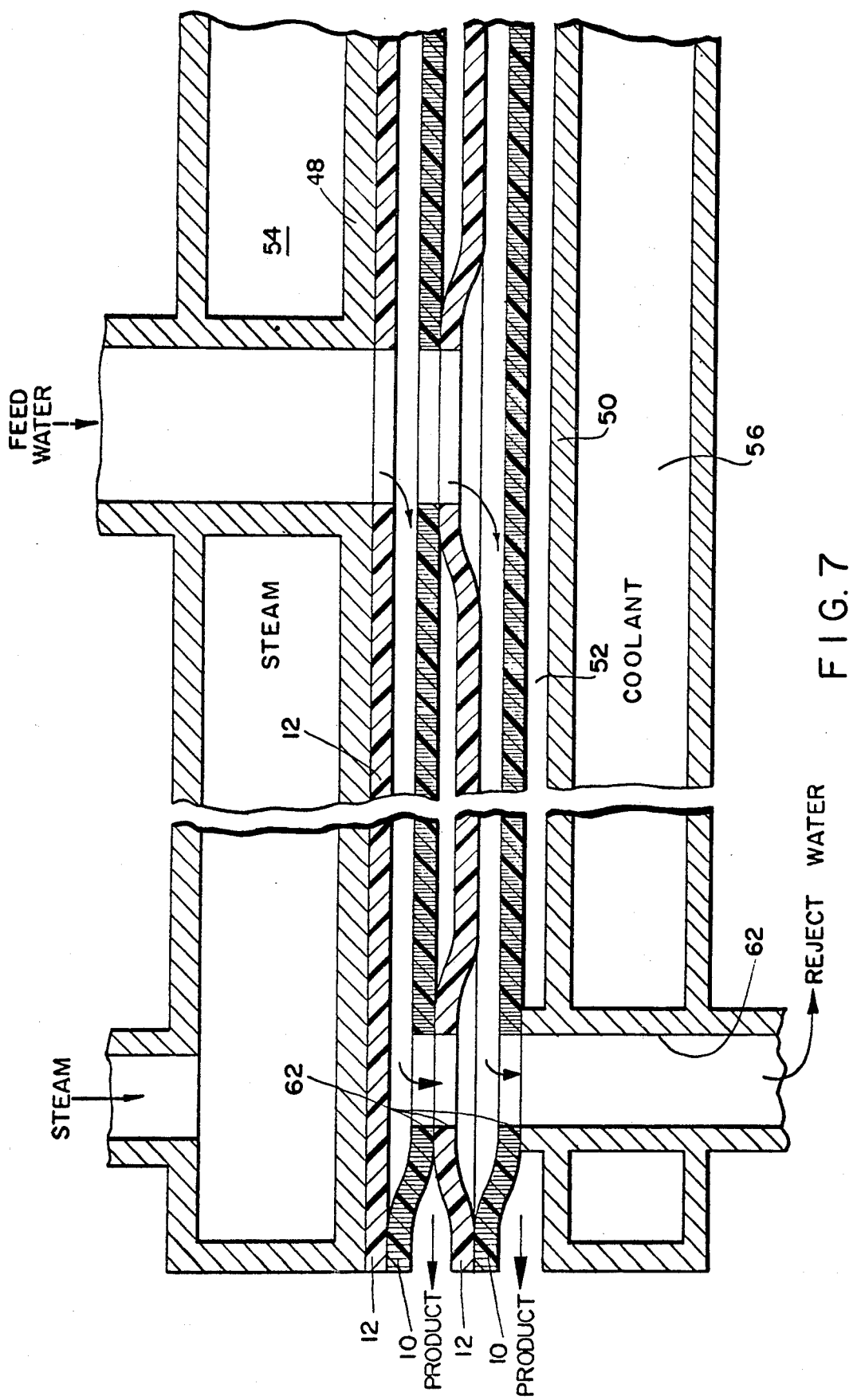
FIG. 7 is an enlarged elevational, sectional view of a portion of the apparatus of FIG. 5 taken substantially along the line 7—7 thereof.

Barrier film 12 should be, as noted, as thin as possible and, in distillation apparatus operating at or near atmospheric pressures, the barrier film may have a thickness, whether it be formed of metal or plastic, of the order of 0.0025 to 0.003 inch. The two-ply structure which is the basic component of the apparatus is made up of a sheet of porous film 10 and barrier film 12 secured to one another in face-to-face relation at or near edges of the two films. The distillation apparatus may take two basic forms and the particular construction of the two-ply assembly will depend on the basic form of apparatus in which it is to be incorporated. For example, the evaporating and condensing sheets of water may, as shown in FIGS. 1 – 4, be in a generally spiral cylindrical form with flow of one of the liquid sheets being along a spiral path; or the sheets may be in a generally planar form with liquid flow in planar paths, as shown in FIGS. 5 – 7. In addition, barrier film 12 may be provided on either or both sides with spacer elements which engage the surfaces of adjacent sheets, e.g., porous films, to separate the barrier film from the adjacent sheet and provide shallow channels between the barrier film and adjacent sheet and spacer elements. The spacer elements may take the form of projecting knobs (not shown) or, as shown in FIGS. 2 – 4, elongated ribs 14 and 16 with the ribs on a side of the film disposed in spaced and generally parallel relation. The evaporating and condensing sheets of water should, as noted, be as thin as possible consistent with obtaining the desired flow rates without the necessity for large hydrostatic pressure differentials, and a typical sheet thickness and, hence, height of ribs 14 and 16 is 0.002 inch with spacing between the ribs of, for example, 0.010 inch or greater. In embodiments in which liquid flow is planar, spacer elements may not be required as the pressure of the liquids will tend to retain the film apart.

For a multiple stage distillation apparatus of the type shown in FIGS. 1 – 4, films 10 and 12 are generally rectangular in shape and are secured to one another along one end edge and two lateral edges at liquid-tight joints. In the case of a metal barrier film 12, this may be accomplished with an appropriate adhesive and in the case of a barrier film formed of an organic plastic material, the two films may be secured together to form a watertight joint by an adhesive or by softening one of the films, preferably the barrier film, with a solvent which is not a solvent for the porous film, and then pressing the films together to adhere them to one another. Softening the barrier film with a solvent is preferred to softening the porous film because this results in penetration of the pores of film 10 by the material of the barrier films, rendering the porous film liquid impermeable in the area of adhesion and forming an extremely strong bond between the two films. Barrier film 12, as shown in FIGS. 2, 3, and 4, is formed with ribs 14 on one side extending in parallel relation transversely of the film and on its other side with ribs 16 extending perpendicularly to ribs 14 in a direction generally parallel with the lateral edges of the films. Barrier film 12 is secured to porous film 10 with ribs 16 facing the porous film so as to form a channel 18 divided by ribs 16 extending from end to end of the two-film assembly thus formed.

This two-film assembly is designed to be coiled about a cylindrical tube 20 commencing at the closed end of channel 18 where the films are secured to one another with porous film 10 disposed outermost to form a distillation unit, generally designated 22, comprising a plurality of convolutions of the two-film structure. Ribs 14 of each convolution of barrier film 12 are engaged with the surface of the previous convolution of porous film 10 to provide channels 24 open at the lateral edges of the films. The first or innermost convolution of barrier 12 is preferably formed without ribs 16, or the ribs are removed, so that the barrier film makes face-to-face contact of substantially its entire surface with tube 20; and in an alternative embodiment, the spaces between ribs 16, the first convolution of film 12 and tube 20 may be filled with a material which is a good thermal conductor. In the assembly shown, barrier film 12 terminates one convolution (outer) short of the end of porous film 10 so that the outer convolution of the assembly comprises the porous film and channel 18 terminates at the end edge of the barrier film. The distillation unit thus formed includes an outer layer or wick 26 formed of an absorbent material, for example, a felted or nonwoven fabric comprising vegetable, animal, metal, or synthetic plastic fiber or a combination thereof. In another embodiment (not shown) the barrier film may be coextensive in length with the porous film and secured thereto at both end edges so as to function as the outer layer or convolution of the coiled assembly and provide added strength and support. In this embodiment, the barrier film would be perforated to permit escape of the condensing liquid into a wick wrapped around the assembly.

Distillation unit 22 is designed to operate with the axis of tube 20 in a generally vertical position so that flow through channels 18 is along a generally horizontal spiral path, whereas flow of liquid through channels 24 is generally vertical and is aided by the force of gravity. Heat for operating the distillation unit is transferred to the system by passing a heated fluid, such as steam, through tube 20 which, for this purpose, may be formed of a good thermal conductor such as copper. The evaporating liquid, e.g., feed water, is circulated downwardly through channels 24 and the condensing liquid comprising the vapor transferred outwardly from channels 24 through porous film 12 and condensed in channels 18, flows along a spiral path outwardly to the end of channel 18 where it is absorbed by outer layer or wick 26. Thus, in the operation of the multiple effect distillation unit, heat is transferred from tube 20 through the first convolution of barrier 12 to the liquid within the innermost channels 24, evaporating the liquid so that the vapor thereof diffuses through porous film 10 to the innermost convolution of channel 18 where the vapor gives up heat by way of the second convolution of barrier film 12 to the evaporating liquid in channels 24 and is condensed to form the condensing liquid within channel 18, etc., through successive stages until the evaporating liquid in the outermost channels 24 is diffused as a vapor through the outermost convolutions of porous films 10 where it is condensed within wick 26 which functions to maintain the outermost sheet or layer of condensing liquid.

A plurality of distillation units 22 are shown somewhat schematically in FIG. 1 assembled together to form distillation apparatus embodying the invention. The apparatus, in this case designed to purify saline water, comprises means providing a steam chamber 28 to which the upper ends of tube 20 are connected; a condensate chamber 30 connected to the lower ends of the tubes for collecting condensed steam; means providing a feed water chamber or header 32 including a header plate 34 engaged around the upper portion of each distillation unit 22 are filled with saline water (or other evaporating liquid) which is fed downwardly through passages 24; means forming a reject water chamber or header 36 including a header plate 38 secured in a manner similar to header plate 34 around the lower ends of distillation units 22 for collecting reject water flowing from the lower ends of channels 24; and means providing a product (water) collecting tray 40 for collecting the product liquid flowing from wicks 26. A fan 42 or an equivalent device is provided for circulating air around and in contact with the liquid impregnated wicks of the various distillation units for evaporating a small percentage of the liquid and thereby transferring heat from the outermost condensing layer of each distillation unit. Other means such as a jacket through which a coolant is circulated, may be provided for withdrawing heat from each of the distillation units.

The auxiliary components of the distillation apparatus are relatively simple and include, in addition to the requisite conduits, a circulating pump 44 for the feed water; a heat exchanger 46 through which the reject and/or product liquids (water) and feed liquid (water) are circulated for preheating and, if desired, deaerating the feed water; and means for generating steam to provide the heat necessary to operate the distillation apparatus.

Each distillation unit when assembled as shown comprises a porous film 10 with pores filled with air and channels 18 and 24 also containing air, and is rendered operative by passing evaporating liquid (feed water) by way of header 32 downwardly through channels 24 and passing steam through tube 20 to heat and evaporate the feed water in the innermost channels 24 closest tube 20. The feed water, as it initially fills channels 24, should be degassed (deaerated) so that at least some of the air within the pores of film 10 is removed from the pores and dissolved in the feed water while the vapor of the feed water diffuses through the pores and condenses on the barrier film on the opposite side of the porous film to form a condensing sheet of deaerated water which shields the porous film from the air. The air previously contained in the pores is then absorbed by the deaerated water in contact with both surfaces of the film and water vapor takes its place. In an alternative method of initiating operation of each distillation unit, the channels 18 for the condensing sheets may be filled with pure water which, preferably, has been deaerated previously; and with either system wick 26 may be impregnated with pure water in order to inhibit admission of dry or relatively dry air into the pores by way of channel 18. As the feed water in the innermost convolution of channel 24 is heated, the vapor therefrom diffuses through the innermost convolution of porous film 10 into the innermost convolution of channel 18 where it gives up heat to the next convolution of barrier film 12 and is condensed, gradually filling the innermost convolution of channel 18 and displacing or absorbing all of the air therefrom. The feed water within channels 24 adjacent this next convolution of barrier film 12 absorbs heat from the barrier film and the liquid and heat transfer process is repeated until the vapor diffusing through the outermost convolution of porous film 10 is condensed within wick 26 from which heat is transferred by evaporation of water from the wick.

During operation of the distillation apparatus, the feed water may be deaerated, for example, at the heat exchanger, so that when such distillation unit is in full operation, the pores of film 10 contain substantially only water vapor at the vapor pressure of water at the temperature of the feed or evaporating water in the adjacent channel. The apparatus may be operated substantially at atmospheric pressure with both the feed and product waters flowing under the force of gravity so that the pressure differential between the vapor in each pore of film 10 and the feed and condensing waters in the adjacent channels is equal to atmospheric pressure plus hydrostatic pressure due to the head of the water less the vapor pressure of the water, so that this pressure differential may be very close to atmospheric. In the event the feed liquid (water) is not thoroughly degassed prior to introduction into a distillation unit, heating of the liquid within the evaporating channels will, of course, force some gas out of solution and some gas will diffuse through the pores together with the vapor producing small bubbles within one or both of the evaporating sheets and the condensing sheets of liquid. The gas within the pores, of course, will include a small percentage of the gas dissolved in the evaporating liquid (where the feed liquid has not been thoroughly degassed) thereby modifying the absolute pressure within the pores and increasing very slightly the resistance to diffusion of the water vapor through the porous film.

As previously noted, at higher temperatures, e.g., above 150°F for water, heat transfer through the liquids is the most critical factor governing the efficiency of the process, whereas at lower temperatures, e.g., below 150°F for water, the presence of air in the liquid and pores becomes the most critical factor. It is possible and may be highly desirable to construct multistage apparatus in which the materials and constructions of the stages are varied in accordance with the differences in operating temperature. For example, it may be desirable to disregard the presence of dissolved gases in the high temperature stages, and make an effort to degas the liquid (water) only in the lower temperature stages; and/or to construct the apparatus with different microporous barrier films in the high and low temperature stages. For example, in the higher temperature stages, the contact angle may be substantially lower than in the low temperature stages, because the pressure differential is lower due to the higher vapor pressure of the liquid. While reducing the contact angle may not appreciably alter the efficiency of the apparatus, it may well result in a substantial reduction in cost of the porous film. Alternatively, because the pressure differential is less in the high temperature stages it may be advisable to employ a porous barrier film having pores larger than those required in the lower temperature stages, particularly if to do so lowers the cost of the porous film. Another factor that becomes increasingly significant at lower temperatures is the thermal conductivity of the porous film and this too should and can be taken into consideration.

A number of other modifications may be made in the structure of the distillation apparatus shown in FIGS. 1 – 4 and are considered to fall within the scope of the invention. These modifications include omission of ribs 14 and 16 from either or both sides of barrier film 12 and in the operation of the apparatus, depending upon the pressure of the liquids to keep the channels open so that the liquids flow therethrough as described. In a typical embodiment, ribs 16 which provide channel 18 for the condensing liquid sheet may be omitted, and in another embodiment, both sets or ribs 14 and 16 may be omitted and relatively short spacing ribs may be provided in place or ribs 14 at the upper edges of barrier film 12 to insure openings for feed water flow at the feed water header. Embodiments of the two-film assembly making up each distillation unit and including a barrier film having projections rather than ribs are assembled and operated in the same manner and are subject to the same modifications.

Ribs 14 are vertical and cooperate to provide a plurality of adjacent vertical channels through which the feed water is circulated downwardly in one direction. In still another alternative embodiment, alternative channels defined by ribs 14, may be closed at their upper ends and adjacent channels closed at their lower ends, so that the feed water is forced to pass from a channel 24, open at its upper end and closed at its lower end, horizontally between a rib 14 and porous film 10 to an adjacent channel which is open at its lower end and closed at its upper end. This provides for a thin film of water between each rib 14 and porous film 10 so that there is vapor transfer through these areas of the porous film and heat transfer through the barrier film is improved.

Reference is now made to FIGS. 5 – 7 of the drawings wherein there is shown another basic form of distillation apparatus in which porous film 10, barrier film 12, and the sheets of evaporating and condensing liquids are generally planar and flow in the layers is preferably horizontal. In the form shown, a distillation unit 47 is made up of a plurality of porous film 10 and barrier film 12 sandwiched together between an upper header plate 48 through which heat is transferred to the distillation unit and a lower header plate 50 through which heat is withdrawn from the unit. The porous and barrier films are, in the form shown, generally circular and the unit is made up, in order, of a barrier film 12 adjacent header plate 48, and porous film 10, etc., terminating in a porous film 10 adjacent header plate 50. The first barrier film, in this case shown uppermost, is disposed in direct contact with header plate 48, and header plate 50 is provided with recesses 52 forming channels in which vapor diffused through the last or lowest sheet of porous film 10 is condensed. Header plate 48 comprises the lower wall of a chamber 54 through which a heated fluid is circulated for transferring heat to the distillation unit to operate the latter, and header plate 50 comprises the upper wall of a cooling chamber 56 through which a cooling fluid is circulated for withdrawing heat from the condensing liquid. In this embodiment, the cooling fluid circulated through cooling chamber 56 may comprise the evaporating or feed liquid (water) or, in an alternative embodiment, a refrigerant which is in the system of a conventional heat pump which withdraws heat from the condensing liquid and transfers it to the evaporating or feed liquid.

All of the films 10 and 12, with the exception of the last or lowest film 10, are formed with aligned openings 58 at their centers and each barrier film 12 is secured at its upper surfaces to the next adjacent surface over an annular area designated 60 surrounding openings 58. In other words, the uppermost barrier film 12 is secured to the header plate 48 and each succeeding barrier film is secured to the next porous film immediately above it in such a way that feed water passing through openings 58 flows between each barrier film 12 and the porous film 10 immediately below it and is unable to pass between each porous film and the barrier film directly beneath it.

All of the porous and barrier films with the possible exception of the uppermost barrier film and lower header plate 50 are formed with a plurality of aligned openings 62 located in spaced relation near the peripheries of the films and follower plate to provide conduits for conducting the reject, evaporating liquid (water) from the evaporating sheets of the distillation unit. The upper surface of each barrier unit 12 is secured in a liquid-tight manner to the next adjacent surface in areas designated 64 surrounding each opening 62, and the last or lowest porous film 10 is secured in a similar manner to header plate 50 so that product water is prevented from entering openings 62. It will be apparent that feed water flow in distillation unit 47 is inwardly (down) through the conduit formed by openings 58, thence radially outward as a thin sheet between each porous film 10 and the barrier film 12 immediately above it and from the unit through the channels formed by openings 62.

The upper surface of each porous film 10 is secured in a liquid-tight manner at a peripheral area 66 extending completely around the porous film to the barrier film immediately above it thereby preventing the feed water from flowing outwardly between the peripheries of adjacent porous and barrier films. The upper surface of each barrier film 12 is secured near its periphery to the next adjacent porous film 10 only at spaced areas 64 so that the condensing or product liquid can escape from between the porous and barrier films at the peripheries thereof, and flow of the condensing liquid is as sheets radially outward in the same direction as the liquid of the evaporating sheets.

Figure 8:
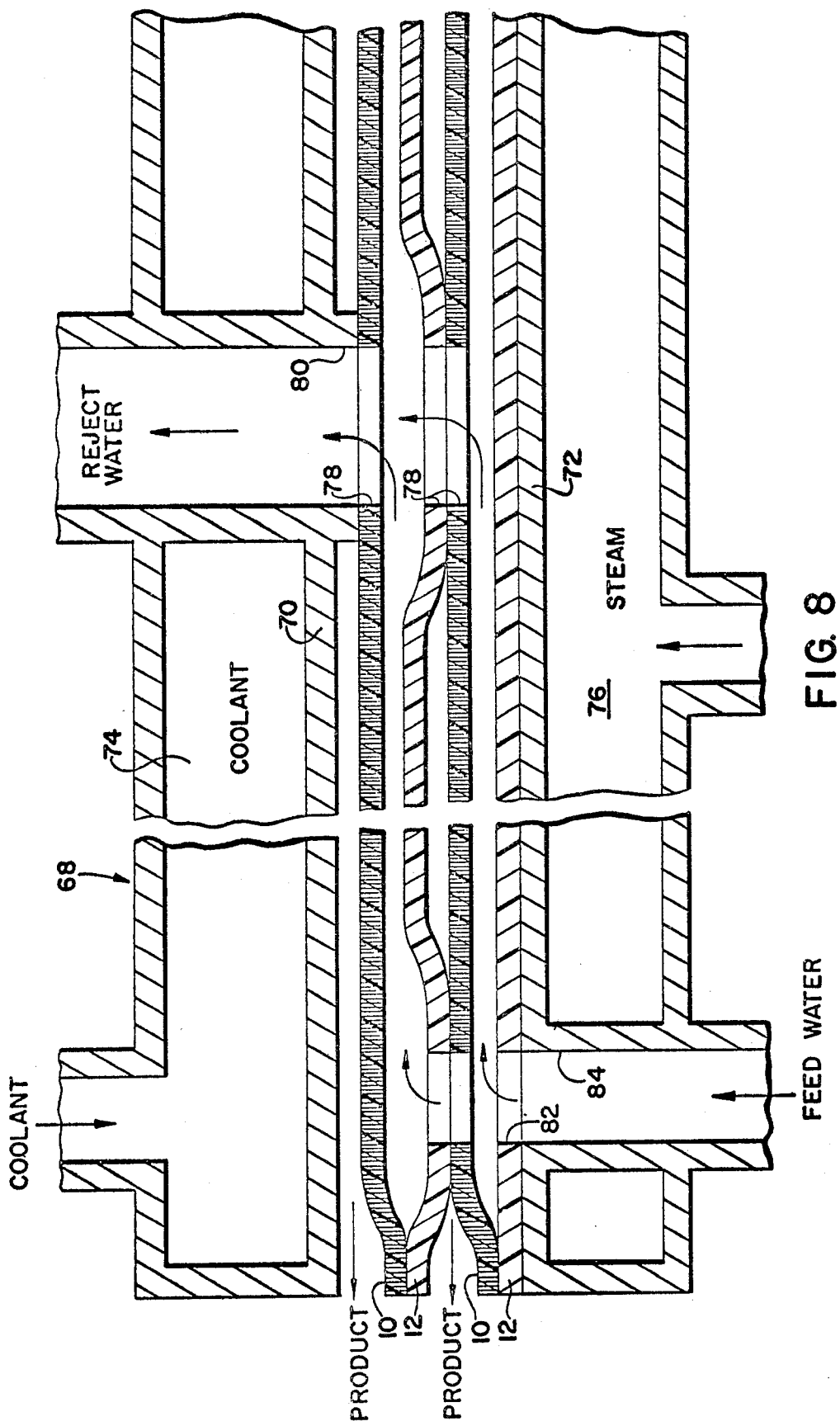
FIG. 8 is an enlarged, elevational, sectional view similar to FIG. 7 illustrating another embodiment of the apparatus.

Another embodiment of the distillation apparatus of the invention is illustrated in FIG. 8 of the drawings. This embodiment is basically similar in construction and operation to the apparatus shown in FIGS. 5 – 7, the principal difference being that the feed water is circulated from the outside of the apparatus inwardly toward the center in the opposite direction to the flow of the product water. This system may be preferred because it tends to maintain a more constant flow velocity in the evaporating layers which helps to prevent scale formation; it minimizes pressure drops in the feed water system while assuring more uniform pressure distribution and utilization of mechanical energy input;

and counter flow of the evaporating and condensing layers improves heat exchange.

This distillation apparatus, designated 68, is shown as comprising a plurality of porous films 10 and barrier films 12 sandwiched between an upper header plate 70 through which heat is withdrawn from the distillation unit and a lower header plate 72 through which heat is transferred to the distillation unit. The porous and barrier films are similar to those previously described being generally circular and the unit is made up (in order from bottom to top) of a barrier film 12 located in contact with header plate 72, porous film 10, another barrier film 12, etc., and terminating in a porous film 10 located adjacent upper header plate 70. Upper header plate 70 comprises the lower wall of a chamber 74 through which a coolant fluid is circulated for transferring heat from a condensation layer of liquid located between porous film 10 and the header plate; and header plate 72 comprises the upper wall of a chamber 76 through which a heated fluid such as steam is circulated for transferring heat to the distillation unit to operate the latter. In this embodiment, like the embodiment disclosed in FIG. 5, the cooling fluid circulated through cooling chamber 74 may comprise the evaporating or feed liquid (water) or in an alternative embodiment, a refrigerant which is in the system of a conventional heat pump which withdraws heat from the condensing liquid and transfers it to the evaporating or feed liquid. All of films 10 and 12, with the exception of the lowermost barrier film 12, are formed with aligned openings 78 at their centers and each barrier film 12 is secured at its lower surface to the next adjacent surface over an annular area surrounding opening 78 while the uppermost porous film 10 is secured to the header plate in an annular area surrounding openings 78 in film 10. An opening and conduit 80 are provided in upper header plate 70 in alignment with openings 78 for conducting reject water from between each porous film 10 and the barrier film 12 located immediately adjacent to and below it. All of the porous and barrier films, with the exception of the uppermost porous film, are provided with a plurality of aligned openings 82 located in spaced relation near the peripheries of the films, and lower header plate 72 is formed with openings and conduits 84 aligned with openings 82 for admitting feed water to the spaces between each porous film 10 and the barrier film 12 located immediately adjacent and below the porous film, to provide the evaporating layers.

It will be seen from this construction that the feed water enters the unit near the periphery thereof (through conduits 84) and flow inwardly toward the center of the unit where it is withdrawn through conduit 80. Uniform pressures and flow rates in the evaporating layers will be maintained more uniformly by circulating the liquid in this manner because the quantity of the evaporating liquid is reduced as the space available to be occupied by the liquid is reduced toward the center of the apparatus. The product water is allowed to flow outwardly from the center of the unit toward the periphery thereof so that the differences between the temperatures of adjacent portions of adjacent evaporating and condensing films are less, thereby improving the efficiency of heat exchange. A number of modifications can be made to the apparatus shown in FIG. 8, including, for example, reversing the positions of the heating and cooling header plates so that heat transfer is in a downward direction, and introducing the feed water and withdrawing the product water through conduits extending through cooling header plate 70. Although none are shown, it may be advisable to provide spacing elements between films 10 and 12 at openings therein in order to insure flow of the liquids between the films from the conduits.

The embodiments of the distillation units shown and described herein by way of example include a plurality of liquid and heat exchange stages and are designed to be operated with a fluid, preferably steam, as the source of heat input. However, it is equally conceivable that the improved porous film of the invention and/or the two-film assembly could, with equal advantage, be incorporated in other forms of distillation apparatus of the single or multiple effect type with other types of heat input. For example, other types of heaters such as electrical resistance heaters may be employed directly; or in areas where sunshine is plentiful, the structures of the invention could be incorporated in solar operated stills in which the sun's energy is utilized to heat the vaporizing liquid directly as in the planar sheet type of apparatus embodied in FIGS. 5 – 8, or to heat the heating fluid as in the spirally coiled type of apparatus shown in FIGS. 1 – 4. In solar operated embodiments in which the sun's energy is utilized directly, single and multiple effect distillation units may be constructed extending over relatively large areas and, in effect, made up of a plurality of units of the type shown in FIGS. 5 – 8 and differing therefrom primarily in that the steam header or chamber is replaced by means for absorbing the energy of the sun, converting it to heat and transferring this heat to the first evaporating layer of liquid. Not only are numerous means of this type disclosed in the prior art, but the novel and improved porous film of the invention can be utilized to advantage in many of the prior art structures in place of the often complex and less efficient vapor permeable liquid barrier employed heretofore.

Thus, it will be seen that the invention offers a simpler, less expensive, and more efficient vapor permeable liquid barrier that can be incorporated in a number of different types of distillation apparatus and which may constitute the heart of the apparatus at least insofar as efficiency and economics are concerned. This improved vapor permeable liquid barrier makes possible novel, less expensive and more efficient distillation apparatus for purifying liquids, particularly water, that comprise two basic elements, namely, a liquid impermeable porous film and a vapor and liquid impermeable barrier film having a relatively low thermal conductivity; and, moreover, these two elements can be combined in any number of ways to produce a variety of constructions designed specifically to fulfill particular needs and operate under particular conditions.

Since certain changes may be made in the above apparatus and method without departing from the scope of the invention herein involved, it is intended that all matter contained in the above description or shown in the accompanying drawings shall be interpreted as illustrative and not in a limiting sense.

What is claimed is:

1. In a distillation method comprising the steps of introducing bodies of a liquid at different concentrations of matter other than said liquid into contact with opposite sides of a microporous membrane substantially non-wettable by said liquid and transferring heat to the higher concentration liquid body in contact with one side of said membrane while transferring heat from the lower concentration liquid body in contact with the other side of said membrane to maintain said higher concentration liquid body at a vapor pressure higher than the vapor pressure of said lower concentration liquid body to cause the vapor of said higher concentration liquid body to pass through the pores of said membrane to said lower concentration body of liquid where said vapor is condensed, the improvement comprising:
removing substantially all gases except the vapor of said liquid from at least said higher concentration body of liquid prior to contacting said membrane with said body of liquid.

2. A distillation method as defined in claim 1, wherein substantially all non-condensible gases are removed from both of said bodies of liquid prior to contacting said membrane with said bodies of liquid.

3. A distillation method as defined in claim 1, wherein the gas within said pores of said membrane is maintained at a pressure no higher than the lower of the hydrostatic pressures of said bodies of liquid.

4. A distillation method as defined in claim 1, wherein the gas within said pores of said membrane is maintained at a pressure no higher than the vapor pressure of said liquid of said higher concentration body.

5. A distillation method as defined in claim 1, wherein said liquid is water.

6. A distillation method as defined in claim 1, wherein substantially all non-condensible gases are removed from said higher concentration liquid and the degassed liquid is thereafter circulated in contact with said one side of said membrane is vaporized and the vapor transferred through the pores of said membrane to said lower concentration body to remove substantially all non-condensible gases from said membrane pores.

7. A distillation method as defined in claim 6, wherein heat is transferred from said lower concentration body of liquid to transfer said vapor through said pores of said membrane and condense said vapor to augment said lower concentration body of liquid and the additional liquid is withdrawn therefrom.

8. In a method of recovering demineralized water from saline water comprising the steps of providing a body of saline water in contact with one side of a substantially hydrophobic, microporous membrane providing a body of demineralized water in contact with the other side of said membrane and transferring heat to said body of saline water while transferring heat from said body of demineralized water to maintain said saline water at a higher vapor pressure than said demineralized water, the improvement comprising:
removing substantially all gas except water vapor from the pores of said membrane by contacting said membrane with saline water containing substantially no non-condensible gases.

9. The method defined in claim 8, including the steps of removing substantially all non-condensible gases from a body of saline water by heating said saline water and thereafter circulating said heated saline water in contact with one side of the microporous membrane.

10. In distillation apparatus for recovering purified vaporizable liquid from a solution of said liquid, said apparatus comprising a microporous membrane having through pores designed to permit the passage of gas while precluding the passage of said liquid by capillary action, means for maintaining a solution of said vaporizable liquid in contact with one side of said membrane, means for maintaining the purified liquid in contact with the other side of said membrane, means for transferring heat to said solution in contact with said one side of said membrane and transferring heat from the purified liquid in contact with the other side of said membrane to cause the vapor of said liquid to pass through said membrane from said one side to said other side and be condensed as purified liquid, the improvement comprising, in combination:
means for removing substantially all gases except the vapor of said liquid from said through pores.

11. Distillation apparatus as defined in claim 10, wherein the last-mentioned means for removing substantially all gases except the vapor of said liquid from said through pores include means for removing non-condensible gases from at least said solution and means for circulating the degassed solution in contact with said one side of said membrane.

12. In a distillation apparatus comprising a hydrophobic, microporous membrane having through pores for permitting the passage of gas while precluding the passage of water as a liquid, means for maintaining bodies of water in contact with opposite sides of said membrane, means for transferring heat to a first body of water in contact with said one side of said membrane, and means for transferring heat from a second body of water in contact with the other side of said membrane, to maintain said first body of water at a vapor pressure higher than said second body of water, the improvement comprising, in combination:
bodies of degassed water in contact with opposite sides of said membrane; and
means for removing non-condensible gases from water and circulating the degassed water as said first body in contact with said one side of said membrane;
said pores of said membrane containing substantially only water vapor.

13. In a multiple stage distillation apparatus including a microporous membrane having through pores designed to permit the passage of gas while preventing the passage of a liquid by capillary action, a plurality of sections of said membrane being arranged in spaced face-to-face relation, a heat conducting barrier element located between adjacent sections of said membrane to provide a feed channel bounded by one surface of each of said sections and a product channel bounded by the opposite surface of said each section, said sections of said membrane and said barrier elements being assembled in alternating stacked relation, and means for withdrawing product liquid from said product channels, the improvement comprising, in combination:
means for introducing a feed liquid into each of said feed channels at one end thereof;
means for withdrawing said feed liquid from said each feed channel at the opposite end thereof;
means for circulating said feed liquid through said feed channels in parallel relation;
first heat transfer means for transferring heat to said liquid introduced into said feed channels;
second heat transfer means for transferring heat from the product liquid in said product channel closest one end of the stack of said membrane sections and barrier elements; and means for removing substantially all gas except the vapor of said feed liquid from the pores of said membrane.

14. Mutiple effect distillation apparatus as defined in claim 13, wherein the last-mentioned means for removing substantially all gas except the vapor of said feed liquid from said pores include means for removing non-condensible gases from said feed liquid prior to circulation of said feed liquid in contact with said membrane.

15. In a method of recovering demineralized water from saline water comprising the steps of providing a body of saline water at a given hydrostatic pressure in contact with one side of a non-wettable, microporous membrane exhibiting a given displacement pressure and containing air within its pores at atmospheric pressure; providing a body of demineralized water at a given hydrostatic pressure in contact with the other side of said membrane and transferring heat to said body of saline water while transferring heat from said body of demineralized water to maintain said saline water at a higher vapor pressure than said demineralized water, the improvement comprising:

evacuating the pores of said membrane to remove substantially all gas except water vapor from the pores of said membrane by contacting said membrane with saline watere containing substantially non air to reduce the pressure within said pores; the difference between the higher of said hydrostatic pressures and the pressure within said pores being less than said displacement pressure.

16. In distillation apparatus comprising a non-wettable, microporous membrane having through pores for permitting the passage of gas while precluding the passage of water and initially containing air at approximately atmospheric pressure and exhibiting a given displacement pressure, means for maintaining bodies of water in contact with opposite sides of said membrane at given hydrostatic pressure, means for transferring heat to a body of water in contact with one side of said membrane, and means for transferring heat from a body of water in contact with the other side of said membrane, the improvement comprising, in combination:

means for removing non-condensible gases from water and circulating the degassed water in contact with said one side of said membrane to thereby evacuate said pores and reduce the absolute pressure therein to essentially the partial pressure of the vapor of said degassed water and effect at least a partial vacuum within said pores; and means for providing that the difference between the higher of said hydrostatic pressures and the pressure within said pores is less than said displacement pressure.

17. The distillation apparatus as defined in claim 16, wherein said membrane pores each have a maximum effective diameter which does not exceed the approximate value $$-(4\gamma \cos\theta/\Delta P)$$

where $\gamma$ is the surface tension of the vaporizable liquid, $\theta$ is the angle of contact at the liquid-gas interface with $\theta > 90°$, and $\Delta P$ is the differential between the absolute hydrostatic pressure of the higher of the hydrostatic pressures of the evaporating and condensing liquids and the absolute pressure of the gas within the pores.

18. In distillation apparatus for recovering purified vaporizable liquid from a solution of said liquid, said apparatus comprising a microporous membrane having through pores designed to permit the passage of gas while precluding the passage of said liquid by capillary action and exhibiting a given displacement pressure, means for maintaining a solution of said vaporizable liquid in contact with one side of said membrane at a given hydrostatic pressure, means for maintaining the purified liquid in contact with the other side of said membrane at a given hydrostatic pressure, means for transferring heat to said solution in contact with said one side of said membrane and transferring heat from the purified liquid in contact with the other side of said membrane to cause the vapor of said liquid to pass through said membrane from said one side to said other side and be condensed as purified liquid, the improvement comprising, in combination:

means for evacuating said pores and reducing the absolute pressure therein to essentially the partial pressure of the vapor of said liquid.

19. The distillation apparatus as described in claim 18, wherein said membrane exhibits a displacement pressure larger than the difference between the higher of the hydrostatic pressures on opposite sides of said membrane and the partial pressure of the vapor of said liquid within said pores.

20. The distillation apparatus as described in claim 18, wherein said membrane pores have a maximum effective diameter which does not exceed the approximate value $$-(4\gamma \cos\theta/\Delta P)$$

where $\gamma$ is the surface tension of the vaporizable liquid, $\theta$ is the angle of contact at the liquid-gas interface with $\theta > 90°$, and $\Delta P$ is the differential between the absolute hydrostatic pressure of the higher of the hydrostatic pressures of the evaporating and condensing liquids and the absolute pressure of the gas within the pores.

21. A still including:

a microporous membrane having through pores for permitting the passage of the vapor of a liquid while precluding the passage of said liquid;

means for maintaining bodies of liquid in contact with opposite sides of said membrane at predetermined hydrostatic pressures;

means for transferring heat to a body of liquid in contact with one side of said membrane;

means for transferring heat from a body of liquid in contact with the other side of said membrane;

means for at least partially evacuating said pores to reduce the absolute pressure therein and increase the yield of said still; said membrane being characterized by exhibiting a displacement pressure in excess of the difference between the higher of said hydrostatic pressures and the lowest partial pressure of the vapor of said liquid that passes through said pores.

22. The still as defined in claim 21, wherein said evacuating means includes means for removing gases from said liquid on one side of said membrane and circulating said degassed liquid in contact with said one side of said membrane.

23. The still as defined in claim 22, wherein said membrane pores each have a maximum effective diameter which does not exceed the approximate value $$-(4\gamma \cos\theta/\Delta P)$$

where $\gamma$ is the surface tension of the vaporizable liquid, $\theta$ is the angle of contact at the liquid-gas interface with $\theta > 90°$, and $\Delta P$ is the differential between the absolute hydrostatic pressure of the higher of the hydrostatic pressures of the evaporating and condensing liquids and the absolute pressure of the gas within the pores.

24. A method of distillation including the steps of:
providing a body of liquid at a given hydrostatic pressure in contact with one side of a microporous membrane;
providing a body of distillate of said liquid in contact with the other side of said membrane at a given hydrostatic pressure;
transferring heat to said body of liquid and from said body of distillate to maintain the vapor pressure of said liquid higher than that of said distillate and cause the vapor of said liquid to pass through said pores; said membrane being characterized by exhibiting a displacement pressure greater than the difference between the higher of said hydrostatic pressures and the partial pressure of said vapor passing through said pores; and
degassing said body of liquid to at least partially reduce the absolute pressure within said pores.

25. The method as defined in claim 24, wherein said membrane pores have a maximum effective diameter which does not exceed the approximate value $$-(4\gamma \cos\theta/\Delta P)$$

where $\gamma$ is the surface tension of the vaporizable liquid, $\theta$ is the angle of contact at the liquid-gas interface with $\theta > 90°$, and $\Delta P$ is the differential between the absolute hydrostatic pressure of the higher of the hydrostatic pressures of the evaporating and condensing liquids and the absolute pressure of the gas within the pores.

* * * * *